(12) United States Patent
Moran et al.

(10) Patent No.: US 7,953,455 B2
(45) Date of Patent: May 31, 2011

(54) WIRELESS TELECOMMUNICATION DEVICE

(75) Inventors: Dov Moran, Kfar Saba (IL); Itzhak Pomerantz, Kfar Saba (IL)

(73) Assignee: Modu Ltd., Kfar Saba (IL)

( * ) Notice: Subject to any disclaimer, the term of this patent is extended or adjusted under 35 U.S.C. 154(b) by 209 days.

(21) Appl. No.: 12/406,327

(22) Filed: Mar. 18, 2009

(65) Prior Publication Data
US 2009/0176528 A1  Jul. 9, 2009

Related U.S. Application Data

(63) Continuation of application No. 11/380,944, filed on Jun. 8, 2006, now Pat. No. 7,509,094.

(51) Int. Cl.
*H04M 1/00* (2006.01)
*H04B 7/00* (2006.01)
(52) U.S. Cl. .... 455/569.1; 455/41.2; 455/39; 455/575.6
(58) Field of Classification Search .................. 455/567, 455/41.2, 569.1, 557, 550.1, 575.6, 100
See application file for complete search history.

(56) References Cited

U.S. PATENT DOCUMENTS

| | | | |
|---|---|---|---|
| 5,898,758 A | 4/1999 | Rosenberg | |
| 6,212,414 B1 | 4/2001 | Alameh et al. | |
| 6,263,218 B1 | 7/2001 | Kita | |
| 6,594,370 B1 * | 7/2003 | Anderson | 381/315 |
| 6,757,551 B2 | 6/2004 | Newman et al. | |
| 6,760,600 B2 | 7/2004 | Nickum | |
| 6,775,206 B2 * | 8/2004 | Karhu | 368/10 |
| 6,882,870 B2 * | 4/2005 | Kivela et al. | 455/567 |
| 6,912,287 B1 | 6/2005 | Fukumoto et al. | |
| 6,957,049 B1 | 10/2005 | Takeda | |
| 6,978,160 B2 * | 12/2005 | Hutchison et al. | 455/573 |
| 7,031,692 B1 | 4/2006 | Zanzi | |
| 7,076,272 B2 | 7/2006 | Ikeda et al. | |
| 7,089,035 B2 * | 8/2006 | Ando et al. | 455/557 |
| 7,130,664 B1 * | 10/2006 | Williams | 455/567 |
| 7,200,416 B2 | 4/2007 | Aisenberg | |
| 7,233,809 B2 | 6/2007 | Kanevsky et al. | |
| 2004/0057578 A1 | 3/2004 | Brewer | |
| 2004/0063475 A1 | 4/2004 | Weng | |
| 2005/0059429 A1 | 3/2005 | Liu et al. | |
| 2005/0141700 A1 | 6/2005 | Takeda et al. | |
| 2005/0207599 A1 | 9/2005 | Fukumoto et al. | |
| 2006/0154688 A1 | 7/2006 | Chai et al. | |

\* cited by examiner

*Primary Examiner* — Sonny Trinh
(74) *Attorney, Agent, or Firm* — Soquel Group LLC

(57) ABSTRACT

A wireless telecommunication device including a foreground unit, and a background unit that is physically separated from the foreground unit and in local communication with the foreground unit. The foreground unit is provided to support incoming calls independently of the background unit. Furthermore, the foreground unit and the background unit cooperate to support outgoing calls. The scope of the invention also includes a method for doing business by offering the foreground unit for sale in a packaging having a form factor selected from the group consisting of: a pen, a pen cap, a wristwatch, and a necklace.

19 Claims, 3 Drawing Sheets

WIRELESS TELECOMMUNICATION DEVICE

CROSS-REFERENCE TO RELATED APPLICATIONS

This application is a continuation of U.S. application Ser. No. 11/380,944 of Moran et al., filed on Jun. 8, 2006, now U.S. Pat. No. 7,509,094.

FIELD OF THE INVENTION

The present invention relates generally to the field of wireless telecommunication devices. More particularly, the present invention relates to small size cellular phones designed for independently receiving and responding to incoming calls.

BACKGROUND OF THE INVENTION

While components of modern cellular phones are designed to be very small in size, commercial handsets are not provided in the smallest possible form factor because of human engineering considerations. There is a lower limit, dictated by human physiognomy, on the sizes of components like a screen and a keypad.

Existing cellular phones known in the art are designed as an integrated device for supporting both incoming and outgoing calls.

As the prior art cellular phones are designed to support both incoming and outgoing calls, they have to include a keypad and a display, which consume a lot of "real estate" and are not at all essential for supporting only incoming calls. Configuring these components in an ordinary cellular phone makes it too heavy and large in size to be conveniently worn within a necklace, clipped on a T-shirt, etc.

However, there are many situations where a user needs to immediately respond to some incoming calls, but does not need to initiate outgoing calls with the same urgency. Such situations are typical to professionals on duty (such as medical doctors, police officers etc.) and to anyone while engaged in sporting activities (such as jogging, riding bicycles, etc.).

Users require different needs and expectations when handling incoming calls and outgoing calls. Some of the major differences are highlighted in the following table:

| Aspect | Incoming call | Outgoing call |
| --- | --- | --- |
| Required response time to a stimulus | 1-3 seconds | Minutes |
| Need to see a screen | No | Yes |
| Need to divert a call to another party | Yes | No |
| Number of clicks for the operation | 1 | Many |
| Ability to batch for later execution | No | Yes |
| Need to be reminded to execute | No | Yes |
| Cost of operation to user | ~0 | Some |
| Need background information | No | Yes |
| Need to repeat on failure (busy) | No | Yes |

Hence, there is a major difference between the minimum sizes of a cellular phone designed to support incoming calls only, and a cellular phone designed to support both incoming and outgoing calls.

A known in the art technique is a pager, i.e. an electronic device used to contact people via a paging network. A pager pre-dates mobile phone technology, but similarly uses radio transmissions to communicate between a control/call center and a recipient. Pager models in use today use digital messages, first numeric and later alphanumeric, to provide the recipient with more information. Such pagers include the ability to send messages in a two-way fashion and even include the ability to send an email. This is known as two-way paging.

However, the pager devices used today require the paged party (i.e. recipient) to phone the control/call centre in order to collect the message either from a cellular telephony network an operator or a voice-mail device.

Another existing technique for small size telephone device is to use a Bluetooth transponder (i.e. a phone that is based on Bluetooth technology) having a base unit associating to one or more handsets.

However, such an ordinary sized phone Bluetooth transponder is limited to supporting a base unit located only few meters away and can not serve the need described above.

Therefore, it would be desirable to provide a cellular phone having a minimum size foreground unit and a background unit, physically separated from the foreground unit and in local communication with the foreground unit, wherein said foreground unit supports incoming calls independently of the background unit, and wherein the foreground unit and the background unit cooperate to support outgoing calls.

SUMMARY OF THE INVENTION

Accordingly, it is a principal object of the present invention to overcome the disadvantages of prior art techniques by introducing a cellular phone having a foreground unit and a background unit that can be physically separated from the foreground unit and can be in local communication with the foreground unit. The foreground unit is implemented to support incoming calls independently of the background unit. The foreground unit and the background unit cooperate to support outgoing calls.

The foreground unit is implemented for supporting incoming calls independently of the background unit, whereas the implementation of the background unit enables the foreground unit to substantially support all the functionalities of a standard cellular phone configuration.

The present invention is further not anticipated by Bluetooth phones described herein above. The handsets of existing Bluetooth phone are not configured to independently support incoming calls. In other words, the base unit and the handsets of a Bluetooth phone must cooperate to support incoming calls.

In accordance with the present invention, there is provided a wireless telecommunication device including: (a) a foreground unit; and (b) a background unit, physically separated from the foreground unit and in local communication with the foreground unit, wherein the foreground unit supports incoming calls independently of the background unit, and wherein the foreground unit and the background unit cooperate to support outgoing calls.

Preferably, the foreground unit may be packaged in a form factor, such as a pen, a pen cap, a wristwatch, a necklace, etc.

Preferably, the foreground unit initiates the outgoing calls in response to non verbal dialing commands received from the background unit via the local communication.

Preferably, the foreground unit includes a user interface for setting a mode of operation of the foreground unit.

Preferably, the background unit, cooperatively with the foreground unit, substantially provides standard cellular telephony services such as initiating outgoing calls, receiving incoming calls, SMS for text messaging, packet switching for access to the Internet, MMS for sending and receiving photos and video, updating meetings in a calendar, recording memos, etc.

The local communication is wireless radio frequency communication. Alternatively, the local communication is wireless infra-red communication. Alternatively, the local communication is wired communication.

Preferably, the foreground unit lacks a keypad.

Preferably, the foreground unit lacks an alphanumeric or a graphic display.

Preferably, the background unit lacks a SIM card.

Preferably, the background unit lacks a cellular antenna.

Preferably, the background unit lacks a microphone.

Preferably, the background unit lacks a speaker.

In accordance with the present invention, there is further provided a method for doing business including the steps of: (a) providing a wireless telecommunication device that includes: (i) a foreground unit; and (ii) a background unit, physically separated from the foreground unit and in local communication with the foreground unit, wherein the foreground unit supports incoming calls independently of the background unit, and wherein the foreground unit and the background unit cooperate to support outgoing calls; and (b) offering the foreground unit for sale in a packaging having a form factor such as a pen, a pen-cap, a wristwatch, a necklace, etc.

Preferably, the background unit, cooperatively with the foreground unit, substantially provides standard cellular telephony services such as initiating outgoing calls, receiving incoming calls, SMS for text messaging, packet switching for access to the Internet, MMS for sending and receiving photos and video, updating a meeting in a calendar, recording memos, etc.

Additional features and advantages of the invention will become apparent from the following drawings and description.

BRIEF DESCRIPTION OF THE DRAWINGS

For a better understanding of the invention with regard to the embodiments thereof, reference is made to the accompanying drawings, in which like numerals designate corresponding sections or elements throughout, and in which.

DETAILED DESCRIPTION OF THE PREFERRED EMBODIMENTS

Figure 1:
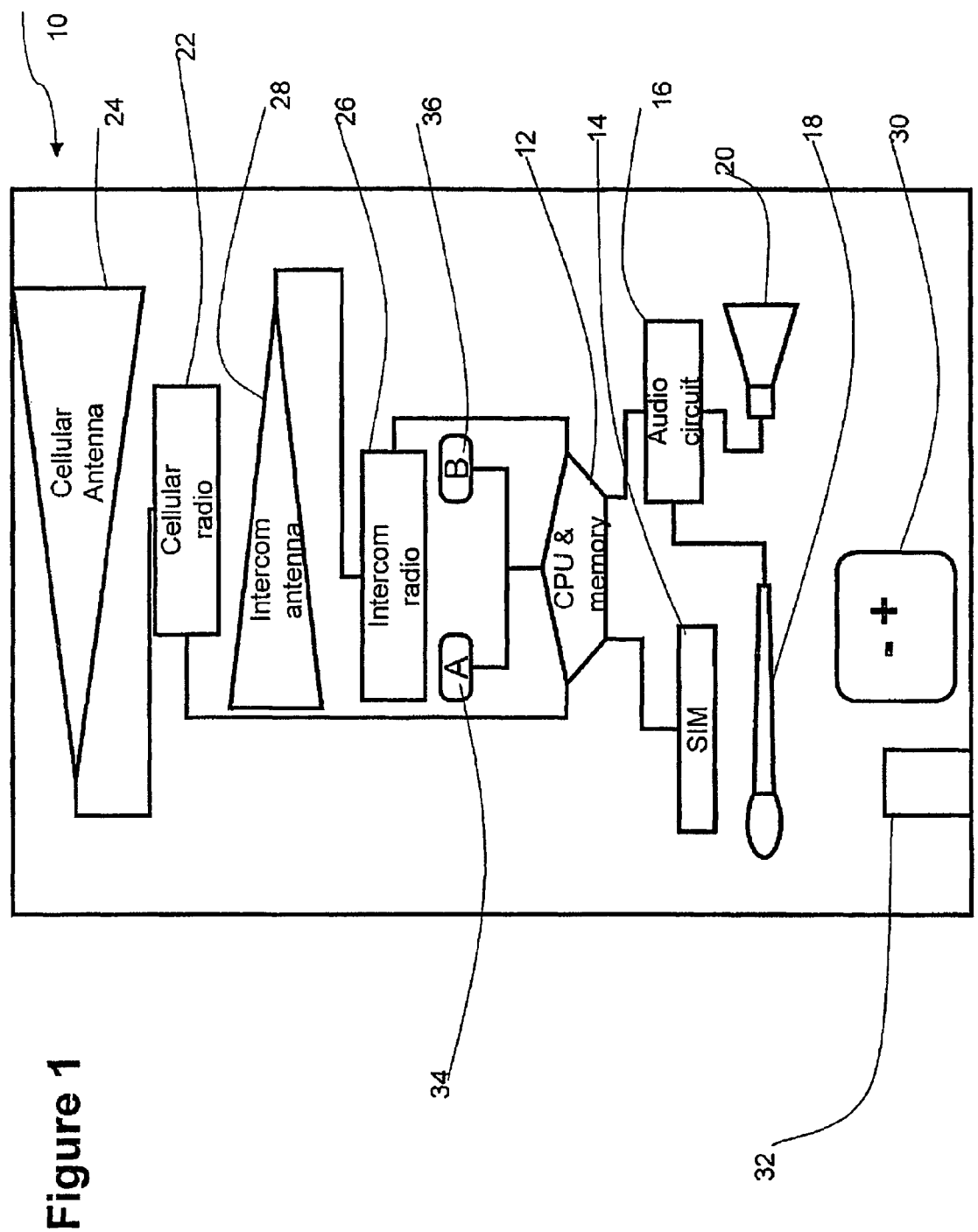
FIG. 1 shows a block diagram of a foreground unit of the present invention.

The present invention discloses an innovative wireless telecommunication device and method including a foreground unit and a background unit that is physically separated from the foreground unit and in local communication with the foreground unit. The foreground unit is implemented to support incoming calls independently of the background unit. The foreground unit and the background unit of the present invention cooperate to support outgoing calls.

The foreground unit enables a user to independently support incoming calls and is designed very small in dimensions, thus enabling packaging within a form factor of a pen, a pen-cap, a wrist watch, a necklace, etc. The foreground unit is further responsive to non-verbal commands communicated from the background unit for dialing outgoing calls. The foreground unit carries out a specific outgoing call in response to a corresponding non-verbal command. The corresponding non-verbal command uniquely determines which outgoing call to dial, either directly or indirectly. The corresponding non-verbal command may be, for example, a designated number to be dialed or a person's name.

The foreground unit of the present invention includes a cellular telephony antenna, a transceiver, a radio subsystem, an audio amplifier, a speaker, a microphone, means for communicating with the background unit, a SIM card, and a minimum-size battery to be recharged from the background unit when plugged into the background unit.

Preferably, the user can initiate outgoing calls using only the foreground unit by way of responding to recent incoming calls, by using voice dialing, by pre-scheduling calls in the background unit and uploading the calls later into the foreground unit as a batch file. Hence, due to the fact that the foreground unit does not contain a full numeric keypad and a display, this unit is designed to be very small in dimensions thus enabling packaging within a form factor of a pen, a pen cap, a wrist watch, a necklace, etc. Furthermore, due to the fact that the user will typically be using the foreground unit remote from the background unit only for short periods of time, the battery is a minimum-size battery supporting only a few hours of operation.

For initiating outgoing calls in cooperation with the foreground unit, the background unit includes components such as a keyboard, a display, a memory, means for wired or wireless communication with the foreground unit, and a battery. This battery is provided also for recharging the minimum-size battery of the foreground when the foreground unit and the background unit are plugged into each other. Due to the fact that the background unit does not need to be handy to the user at all times, it can be designed in a convenient form-factor for use with both hands, for positioning on a desk or on the lap of the user, etc.

Although the basic background unit of the present invention lacks a microphone and a speaker, a microphone and/or a speaker optionally can be further implemented in the background unit providing better performance.

The background unit, cooperatively with the foreground unit, substantially supports standard cellular telephony services, such as initiating outgoing calls, receiving incoming calls, SMS for text messaging, packet switching for access to the Internet, MMS for sending and receiving photos and video, updating a meeting in a calendar, recording memos, etc.

Referring now to FIG. 1, there is shown a block diagram of a foreground unit 10 of the present invention. The foreground unit 10 is provided for supporting incoming and outgoing calls and includes a CPU and memory unit 12 connected to a removable memory card 14 (e.g. SIM card). The removable memory card 14 enables to independently connect to a cellular telephony network via data specific to the user.

The CPU and memory unit 12 is further connected to an Audio circuit 16 (e.g. amplifying card), provided to support the audio functions of the foreground unit. Audio circuit 16 is connected to a microphone 18 and a speaker 20, which are essential for enabling the user to receive the incoming call and to respond to it accordingly.

The CPU and memory unit 12 is further connected to a cellular radio set 22 for carrying out telecommunication functions of the foreground unit. The cellular radio set 22 is connected to a cellular antenna 24 for transmitting and receiving electromagnetic signals.

Figure 2:
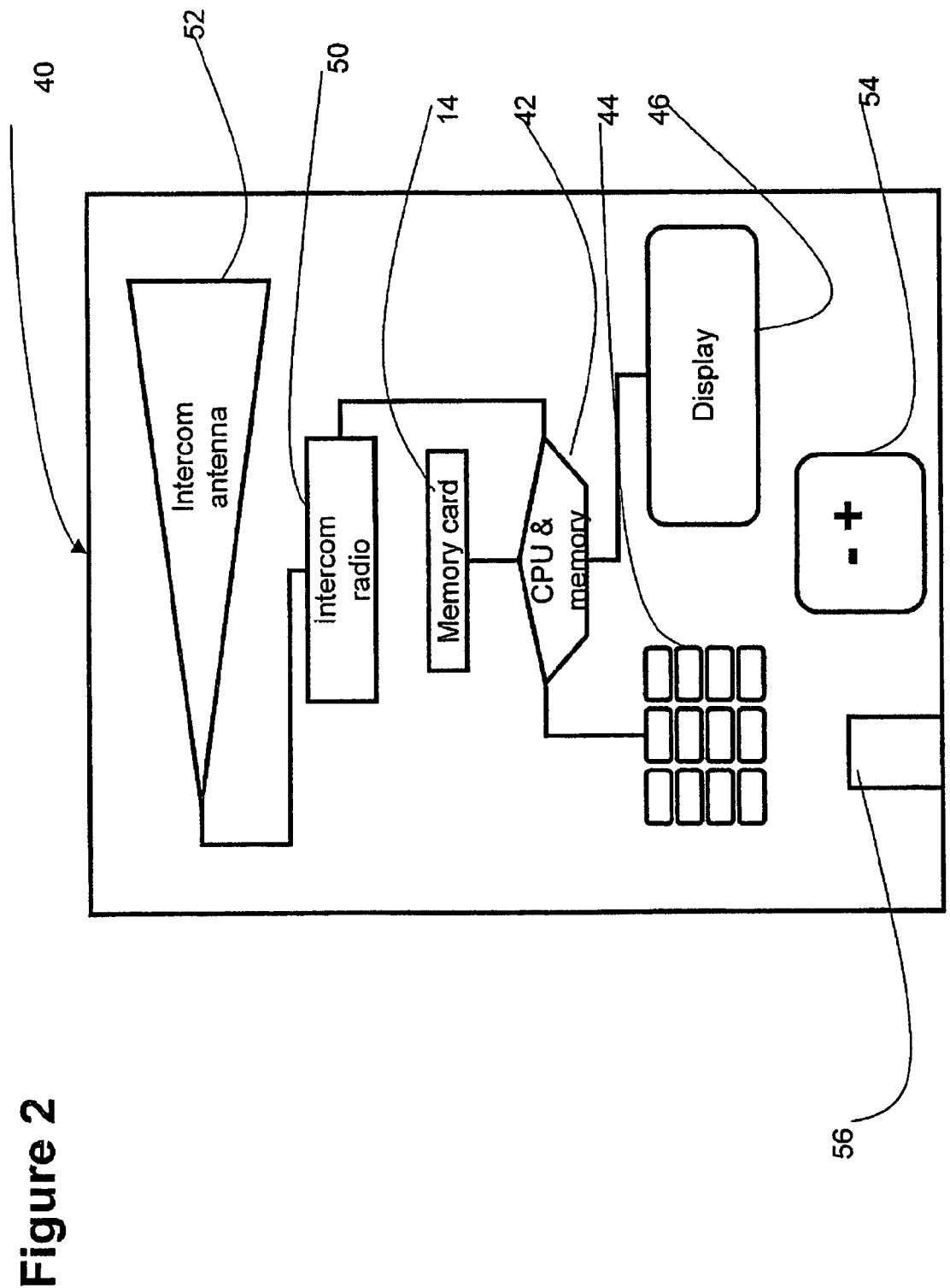
FIG. 2 shows a block diagram of a background unit of the present invention.

The CPU and memory unit 12 is further connected to an intercom radio set 26 and to an intercom antenna 28 for wireless communication with the background unit 40 (see FIG. 2). This wireless communications is for example Bluetooth, wireless infra-red communication, UWB (Ultra Wide Band) communication, or other radio-frequency communication. The user can respond to incoming calls without any support of the background unit. For outgoing calls, the foreground unit 10 is responsive to non-verbal dialing commands (typically a number to be dialed) received from the background unit 40 via the intercom antenna 28. A specific non-verbal dialing command uniquely determines which outgoing call to dial.

Alternatively, the communication between the foreground and background units is a wired communication, whereby the foreground unit is plugged into the background unit, to become an integral, fully functional mobile handset.

The foreground unit 10 provides the wireless telecommunication in response to manipulating a user interface. According to the preferred embodiment, the user interface is configured as two control keys 34 and 36. Manipulating these two control keys 34 and 36 operates the foreground unit 10 as follows:

In case foreground unit 10 is in idle mode, then pressing key 34 once redials the number of the last incoming call, while double-clicking on key 36 sets the foreground unit to operate a specific functionality, as follows:

Re-pressing key 36 may set foreground unit 10 to respond to next outgoing call in the queue of outgoing calls (this queue can be created and controlled by the background unit 40 (see FIG. 2). Each outgoing call in the queue can include a dialing number and a short voice reminder providing the user information on the specific outgoing call. Typical voice reminders are—"call George to cancel tomorrow's breakfast", "call Delta to reserve flight to Chicago", or "return Bernard's call", etc.

Optionally, re-pressing key 36 sets foreground unit 10 to start/stop recording. Such setting may be employed for using the foreground unit as a digital tape recorder.

Optionally, re-pressing key 36 sets foreground unit 10 on a caller filter on/off mode. Activating or deactivating the incoming call filter may be employed, for example, to selectively receive incoming calls.

Optionally, re-pressing key 36 sets foreground unit 10 on activate voice dialing—for activating and deactivating a voice dialing module, such that an outgoing call is initiated only by pronunciation of the required phone number or person's name.

In case foreground unit 10 is ringing (using audio circuit 16 and speaker 20), then pressing key 34, for example, initiates the incoming call, while pressing key 36, for example, rejects the incoming call.

In case an incoming call has begun, then pressing key 34 terminates the incoming call, while pressing key 36 toggles (starts/stops) recording of the incoming call.

The foreground unit 10 provides an audio feedback indicating the specific functionality in which foreground unit 10 is currently set to operate in. In one preferred embodiment, a visual indication by a couple of light emitting diodes serves as an alternative indication of the mode.

Although the preferred embodiment of foreground unit 10 of the present invention described above uses two keys, any convenient number of keys may be provided for supporting the functionalities described herein.

The foreground unit 10 further includes a battery 30 as means for providing power and a port 32, such as a standard USB port or a USB port with extra pins, for charging the foreground unit 10 and for providing a wired connection to the background unit 40 when the foreground unit 10 is not in use remotely.

Referring to FIG. 2, there is shown a block diagram of a background unit 40 of the present invention. Background unit 40 includes the standard components of a cellular phone, most of which can be found in any digital cellular phone, which are not provided in the foreground unit.

Background unit 40 includes a CPU and memory unit 42 connected to a Numeric Keypad 44. The Numeric Keypad 44 is provided in the background unit for dialing outgoing calls as well as for typing emails and other text messages.

Numeric Keypad 44 is further connected to a Display 46, which is provided for displaying the number of the initiated outgoing call as well as messages transmitted from the CPU.

CPU and memory unit 42 is further connected to a local communication system (such as a Bluetooth radio communication system) including an Intercom radio 50 and an Intercom antenna 52 for wirelessly communicating with the foreground unit 10 (see FIG. 1).

In one preferred embodiment, the CPU and memory unit 42 is connected to the removable memory card 14 (see FIG. 1) for conveniently storing the user's data.

Background unit 40 includes a battery 54 for power and a USB port 56 providing a wired connection to other computing devices, such as the foreground unit 10.

Figure 3:
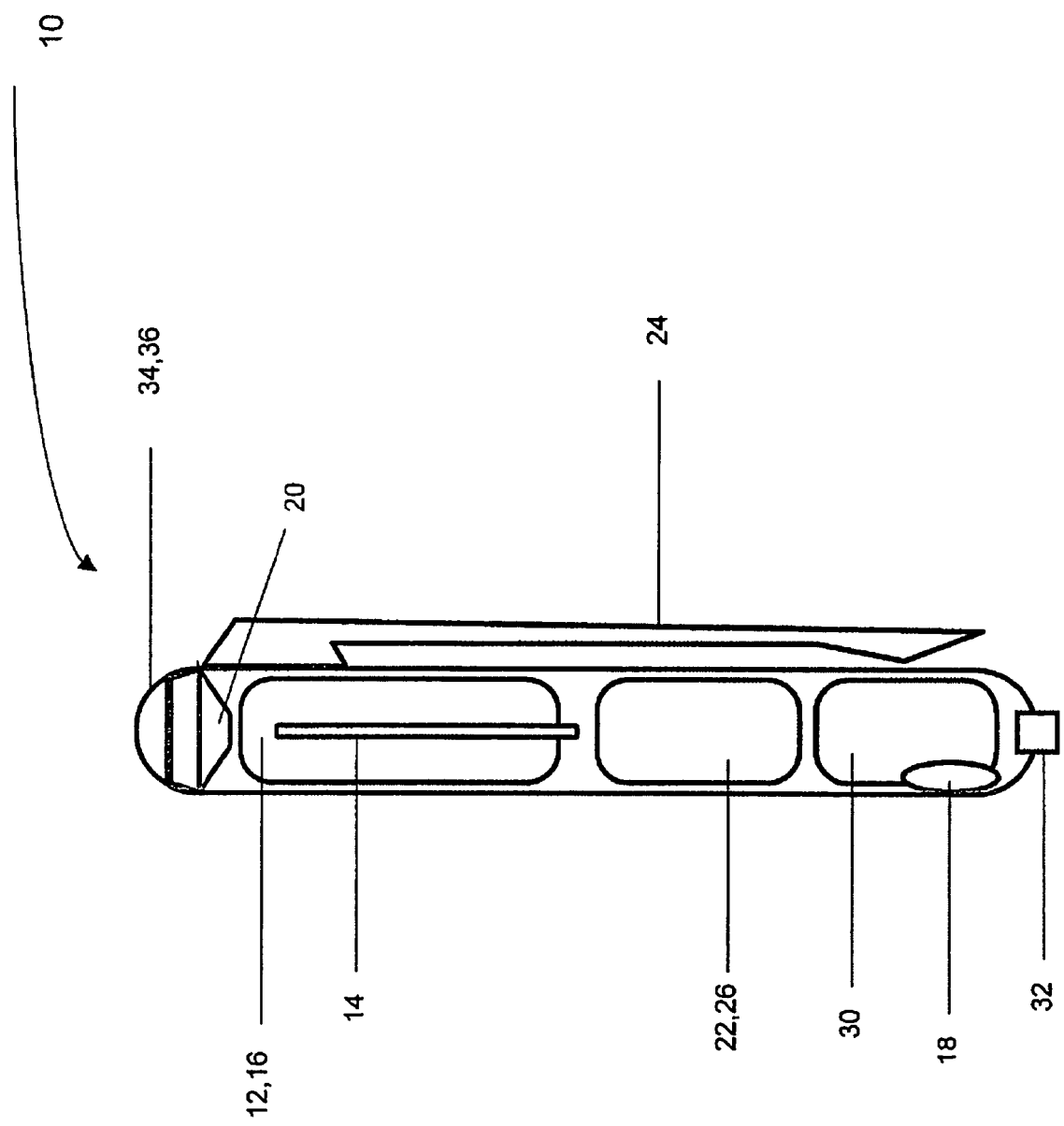
FIG. 3 shows the foreground unit of FIG. 1 designed with a form factor of a pen.

Referring now to FIG. 3, there is shown the foreground unit 10 of FIG. 1 designed with a form factor of a pen. Foreground unit 10 includes an electrical circuit of the CPU and memory unit 12 and the Audio unit 16 (of FIG. 1). The foreground unit 10 further includes the SIM card 14, two control keys 34, 36, the speaker 20, the microphone 18, the intercom radio set 26 and cellular radio set 22, the USB port 32, the cellular antenna 24, and the battery 30. These units are compactly and conveniently embedded in this example within a form factor of a pen.

Although the background unit is illustrated as lacking a microphone, it optionally may have a duplicate microphone for better performance or more convenient location than the foreground microphone.

Preferably, the background unit lacks a speaker. Optionally, the background unit may have a duplicate speaker for better performance or more convenient location than the foreground speaker.

It can be understood that other implementations and designs are possible within the scope of the invention, thus relating to any wireless telecommunication device and method having a minimum size foreground unit and a background unit, physically separated from the foreground unit and in local communication with the foreground unit, wherein said foreground unit supports incoming calls independently of the background unit, and wherein the foreground unit and the background unit cooperate to support outgoing calls, such that the background unit includes only the components that are required to enable the foreground unit such functionalities.

Having described the invention with regard to certain specific embodiments thereof, it is to be understood that the description is not meant as a limitation, since further modifications will now suggest themselves to those skilled in the art, and it is intended to cover such modifications as fall within the scope of the appended claims.

The invention claimed is:

1. A wireless telecommunication device comprising:
   (a) a foreground unit; and
   (b) a background unit, physically attachable to and detachable from said foreground unit;

wherein said foreground unit supports incoming calls independently of said background unit, and wherein said background unit controls said foreground unit for making outgoing calls when physically attached thereto.

2. The wireless telecommunication device of claim 1, wherein said foreground unit is packaged in a form factor selected from the group consisting of: a pen, a pen cap, a wristwatch, and a necklace.

3. The wireless telecommunication device of claim 1, wherein said foreground unit includes a user interface for setting a mode of operation of said foreground unit.

4. The wireless telecommunication device of claim 1, wherein said background unit, cooperatively with said foreground unit, substantially provides standard cellular telephony services.

5. The wireless telecommunication device of claim 1, wherein said background unit comprises a battery, and wherein said foreground unit comprises a battery that can be charged by said background unit battery when said background unit is physically attached to said foreground unit.

6. The wireless telecommunication device of claim 1, wherein said foreground unit lacks a keypad for making the outgoing calls.

7. The wireless telecommunication device of claim 1, wherein said foreground unit lacks a full numeric keypad for making the outgoing calls.

8. The wireless telecommunication device of claim 1, wherein said foreground unit lacks a display.

9. The wireless telecommunication device of claim 1, wherein said background unit lacks a SIM card.

10. The wireless telecommunication device of claim 1, wherein said background unit lacks a cellular antenna.

11. The wireless telecommunication device of claim 1, wherein said background unit comprises a microphone.

12. The wireless telecommunication device of claim 1, wherein said background unit lacks a microphone.

13. The wireless telecommunication device of claim 1, wherein said background unit comprises a speaker.

14. The wireless telecommunication device of claim 1, wherein said background unit lacks a speaker.

15. The wireless telecommunication device of claim 1, wherein said background unit comprises a display.

16. The wireless telecommunication device of claim 15, wherein said display displays call information during an incoming or outgoing call, when said background unit is physically attached to said foreground unit.

17. The wireless telecommunication device of claim 1, wherein said foreground unit further comprises:
   a cellular radio;
   a cellular antenna connected to said cellular radio;
   a speaker; and
   a microphone,
wherein said speaker, said microphone and said cellular radio enable the foreground unit to support incoming calls independently of said background unit.

18. The wireless telecommunication device of claim 1, wherein said background unit further comprises a numeric keypad for controlling the outgoing calls made by the foreground unit.

19. A foreground unit for a wireless telecommunication device, comprising:
   a cellular radio;
   a cellular antenna connected to said cellular radio;
   a speaker;
   a microphone; and
   means for communicating with a background unit for a wireless telecommunication device,
wherein said speaker, said microphone and said cellular radio enable the foreground unit to support incoming calls independently of said background unit, and wherein said foreground unit is controllable by said background unit, via said means for communicating, for making outgoing calls.

* * * * *